United States Patent
Renfrew

(10) Patent No.: US 10,045,229 B2
(45) Date of Patent: Aug. 7, 2018

(54) SYSTEM AND METHOD FOR MONITORING AND TRAFFIC MANAGEMENT IN CELLULAR NETWORKS BASED ON CELLULAR ATTRIBUTES

(71) Applicant: Keysight Technologies, Inc., Minneapolis, MN (US)

(72) Inventor: Craig Renfrew, Stirling (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 170 days.

(21) Appl. No.: 14/634,592

(22) Filed: Feb. 27, 2015

(65) Prior Publication Data

US 2016/0255021 A1    Sep. 1, 2016

(51) Int. Cl.
- *H04W 4/00* (2018.01)
- *H04W 24/02* (2009.01)
- *H04W 84/04* (2009.01)

(52) U.S. Cl.
CPC .......... *H04W 24/02* (2013.01); *H04W 84/042* (2013.01)

(58) Field of Classification Search
CPC ......... H04L 49/70; H04L 45/42; H04L 45/74; H04W 24/02; H04W 84/042
USPC ....................................................... 370/328
See application file for complete search history.

(56) References Cited

U.S. PATENT DOCUMENTS

| | | | |
|---|---|---|---|
| 7,385,924 B1* | 6/2008 | Riddle | H04L 12/2602 370/235 |
| 8,483,181 B2 | 7/2013 | Lakshmikanthan | |
| 2012/0196617 A1* | 8/2012 | Sun | H04W 36/0061 455/456.1 |
| 2013/0044724 A1* | 2/2013 | Lim | H04W 76/02 370/329 |
| 2014/0153572 A1 | 6/2014 | Hampel | |
| 2015/0055623 A1* | 2/2015 | Li | H04W 40/04 370/331 |

OTHER PUBLICATIONS

Combined Search and Examination Report dated Aug. 10, 2016, Application No. GB1603197.3.
Examination Report dated Mar. 9, 2018, UK Application No. GB1603197.3.

* cited by examiner

*Primary Examiner* — Peter Cheng

(57) ABSTRACT

A system and method for operating a cellular network is disclosed. The system includes a cellular network, a transport plane software defined switch (SDS), and a controller. The transport plane SDS is inserted in the transport plane and forwards user data packets between nodes of the cellular network based on forwarding attributes of the data packets. The controller includes a control plane database that stores a correspondence between the forwarding attributes and the cellular attributes of the plurality of nodes. The controller is configured to receive user input specifying a forwarding change in the transport plane SDS in terms of one of the cellular attributes. The controller uses the control plane database to determine a forwarding attribute corresponding to the one of the cellular attributes and downloads a forwarding rule to the transport plane SDS.

15 Claims, 4 Drawing Sheets

SYSTEM AND METHOD FOR MONITORING AND TRAFFIC MANAGEMENT IN CELLULAR NETWORKS BASED ON CELLULAR ATTRIBUTES

BACKGROUND

Packet switching networks such as the internet are constructed from a switching fabric that includes switches that forward packets of data received on one port of the switch to another port on the switch that is determined by data in the header of the packet. The switch inspects the packet header fields to determine information about the packet being processed. This information is used to index a table of rules that specifies the identity of the switch port(s) that are to receive the packet. For example, the packet header includes information specifying the origin address of the packet and the destination address for the packet. A rule that examines the destination address information might indicate that the packet should be forwarded via a specific port on the switch. If the packet header information indicates that the packet is directed to a plurality of destinations, then the switch might forward the packet through a plurality of ports based on a corresponding rule or rules.

Recent advances in switch design and control have resulted in significant advances in network control. These advances have resulted in so-called "software defined networks" or SDNs. SDNs use generic switches that utilize a particular set of fields within the packets to define the switching rules. The rule set can be loaded into each switch by an SDN controller. The SDN controller operates continuously in a manner that allows the network fabric to be modified without taking the network down. A new rule can be sent to a particular switch, which then changes its routing behavior for packets that satisfy the conditions of the new rule. Multiple SDN controllers can operate on the same switching fabric provided a new rule sent by one SDN controller does not conflict with an existing rule.

SDNs are providing significant improvements in the control and monitoring of conventional packet switching networks. The SDNs can use generic switches which have much less "intelligence" built into the individual switches, and hence, reduce the cost of the switching fabric. In addition, by moving the intelligence to external controlling software that "views" the entire network, more sophisticated packet routing and monitoring can be implemented, which provides better utilization of the network capacity by, for example, allowing traffic to be dynamically routed to avoid congestion.

Cellular communications systems have networks that are also constructed from a switching fabric that could, in principle, be improved by utilizing an SDN. However, the differences between a cellular network and a generic packet switching network inhibit such improvements.

SUMMARY

The present invention includes a system and method for operating a cellular network. The system includes a cellular network, a transport plane SDS, and a controller. The cellular network has a control plane and transport plane and a plurality of internal nodes, each internal node being characterized by a cellular attribute and a forwarding attribute, the cellular attribute being different from the forwarding attribute. The transport plane SDS is inserted in the transport plane and forwards user data packets between nodes of the cellular network, the forwarding being determined by forwarding attributes in the user data packets. The controller includes a control plane database that stores a correspondence between the forwarding attributes and the cellular attributes of the plurality of nodes. The controller is configured to receive user input specifying a forwarding change in the transport plane SDS in terms of one of the cellular attributes. The controller uses the control plane database to determine a forwarding attribute corresponding to the one of the cellular attributes and downloads a forwarding rule to the transport plane SDS that causes the transport plane SDS to execute the forwarding change. In one aspect of the invention, the forwarding attribute includes an IP address.

In another aspect of the invention, a control plane SDS is inserted in the control plane and controlled by the controller, the control plane SDS forwarding packets in the control plane between nodes of the cellular network. The controller selectively copies control plane packets that are forwarded by the control plane SDS and generates the control plane database from the information in the copied control plane packets.

In yet another aspect of the invention, one of the selectively copied control plane packets comprised information specifying a cellular attribute for one of the plurality of internal nodes and an IP address for that one of the plurality of internal nodes.

In a still further aspect of the invention, one of the selectively copied control plane packets is specified by a forwarding rule based on an SCTP field value in the one of the selectively copied control plane packets or is a packet sent as part of a procedure in which a UE in a cell of the cellular network registers with the cellular network.

In another aspect of the invention, the control plane SDS and the transport plane SDS are implemented in a single SDS.

In yet another aspect of the invention, the controller further generates a transport plane database relating IP addresses in packets passing through the transport SDS to ports of the transport SDS through which the packets pass and whether the packets were inbound to or outbound from the transport SDS. In one aspect of the invention, the transport plane database also relates the IP addresses to Ethernet MAC addresses, VLAN, and MPLS tags in the packets passing through the transport SDS.

In a still further aspect of the invention, the cellular network is an LTE cellular network characterized by a plurality of eNBs, an MME, an HSS, and an SGW, and the single SDS receives packets from the eNBs, MME, HSS or SGW and forwards the packets to either the eNBs, MME, HSS or the SGW depending on the format of the packets.

In another aspect of the invention, the cellular network is a GSM cellular network characterized by a plurality of BTSs, a BSC, an MSC, an SGSN and an HLR, and the single SDS receives packets from the BTSs, BSC, MSC, SGSN or HLR and forwards the packets to either the BTSs, BSC, MSC, SGSN or HLR depending on the format of the packets.

In a still further aspect of the invention the cellular network is a UMTS cellular network characterized by a plurality of NodeBs, an RNC, an MSC, an SGSN and an HLR, wherein the single SDS receives packets from the NodeBs, RNC, MSC, SGSN and HLR and forwards the packets to either the NodeBs, RNC, MSC, SGSN and HLR depending on the format of the packets.

DETAILED DESCRIPTION

In general, traffic within a cellular network can be divided into control plane traffic and transport plane traffic. The control plane of a cellular network is defined to be the set of packets that encode the methods and procedures that allows a mobile user handset to interact with a cellular network to manage authentication and identity tracking, manage mobile user mobility, control voice calls and control data sessions. These methods and procedures can be defined by appropriate standards bodies such as 3GPP. The transport plane of a cellular network is defined to be the set of packets that encode voice and data from the mobile user handset for transportation across the cellular network to endpoints outside the cellular network or to other mobile user handsets inside the cellular network.

A cellular attribute is defined to be an attribute describing a network element, or an attribute associated with a user identity, or an attribute associated with a user location. Examples of cellular attributes are the MME, IMSI, and LAI attributes discussed below. Different cellular network standards define cellular attributes that are particular to those networks.

A forwarding attribute is defined to be an attribute that a typical LAN switch or router would use to determine the destination of a packet. Examples of forwarding attributes are MAC address, IP addresses, VLAN tags and MPLS tags associated with packets that are being forwarded through the switch or router.

Figure 1:
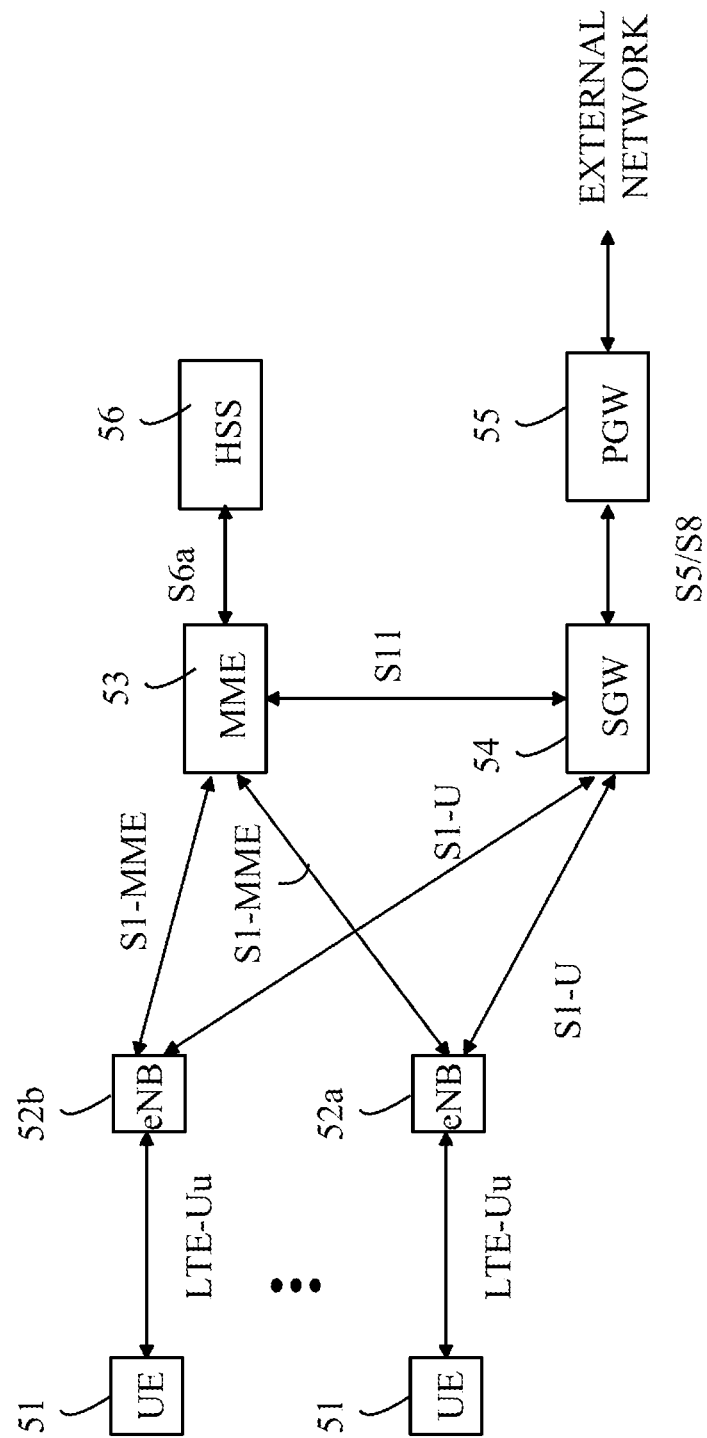
FIG. 1 illustrates the key components of an LTE cellular network.

The manner in which the present invention provides its advantages can be more easily understood with reference to FIG. 1 which illustrates the key components of an LTE cellular network. Each cell in the network is managed by a component referred to as an evolved Node B (eNB). Exemplary eNBs are shown at 52a and 52b. Each eNB manages communications between user equipment 51 and the eNB over an interface referred to as LTE-Uu. The details of this interface are defined in various standards and are not central to the present invention, and hence, will not be described in detail here. The cellular network includes a number of nodes that manage the communications between the eNBs and an external network. One group of nodes packages user data for transmission to the external network. This group of nodes includes a serving gateway (SGW) 54 and a packet gateway (PGW) 55. All user IP packets are transferred through the SGW, which serves as the anchor point when a UE moves from one eNB to another. The SGW also serves other functions; however, to simplify the present discussion, these functions are omitted. The PGW allocates IP addresses for the UEs and regulates the bandwidth assigned to any given UE based on the terms of the contract between the UE and the cellular network. Communications between the eNBs and the SGW utilize a protocol referred to as GTP-U that is carried on a first interface referred to as S1-U.

The Mobility Management Entity (MME) 53 is the control node that processes the control plane signaling between the UE and the rest of the cellular network. The communications between MME 53 and the eNBs utilizes a protocol referred to as S1-AP that is carried on a second interface referred to as S1-MME. MME 53 communicates with the Home Subscriber Server (HSS) 56 that contains users' subscription data such as the quality of service (QoS) profile and any access restrictions for roaming. It also holds information about the packet data networks to which the user can connect. In addition, HSS 56 also holds dynamic information such as the identity of the MME to which the user is currently attached or registered. These communications use a protocol referred to as Diameter that is carried on yet a third communication interface, referred to as S6a.

It is clear from the above discussion that monitoring and troubleshooting the internal functioning of a cellular network poses significant challenges due to the numerous communication interface protocols and the division of the processing functions into multiple nodes. In addition, the individual nodes may be from different vendors and vary from cellular network to cellular network. The problem is further complicated by the need to understand and monitor the cellular network in terms of the cellular network attributes of the various nodes which are not explicitly present in many of the packets flowing within the cellular network.

In general, a cellular network can be viewed as having two communication layers. The first layer will be referred to as the transport plane or transport layer in the following discussion. The transport layer is responsible for moving user data between network elements within the cellular network and to and from the external network. Packet attributes such as Ethernet MAC addresses, IP addresses, VLAN tags and MPLS tags are used in packet forwarding decisions by network switches in this communication layer. These packet attributes will be referred to as forwarding attributes in the following discussion. The packets on the communication links that make up this layer contain the cellular data as payloads. The second layer is the cellular plane that is used to communicate the various setup and control messaging responsible for user authentication, temporary identity tracking, allocation of cellular network resources and UE location tracking within the cellular system.

Transmissions in the transport layer typically refer to IP addresses rather than cellular attributes. For the purposes of the present discussion, a cellular attribute is defined to be a property of the cellular network component that receives or transmits a packet in the transport layer that is different from the forwarding attributes that route packets in the transport layer. For example, a packet from eNB 52a that is sent to SGW 54 will include the source IP address of eNB 52a and the destination IP address of SGW 54. However, the cellular network identity of eNB 52a, i.e., its LTE cell ID number, is not explicitly present in the packets. Hence, an attempt to monitor transport level communications from a particular eNB cannot be made without knowing the correspondence between cell ID number and IP address. Furthermore, individual nodes in the cellular network may have multiple IP addresses. In this case, the particular IP address that is being used depends on other factors. The correspondence between various cellular attributes of the nodes in the system and the corresponding IP addresses are defined in various communications at the management layer of the cellular system. While some of these assignments are static, others can change over time. Hence, the ability to ascertain the cellular attributes of the nodes communicating in the transport layer from the IP addresses or other fields in the transport packets presents significant challenges.

The problem of monitoring the network using the cellular attributes of the nodes is further complicated by the fact that different cellular networks have different attributes depending on the particular type of network and the particular implementation of that network. These attributes are defined in the various standards that govern each type of network. Hence, any monitoring system that relies on the cellular attributes must be customized to the particular implementation of that network and the attributes defined within the standards for that network.

Figure 2:
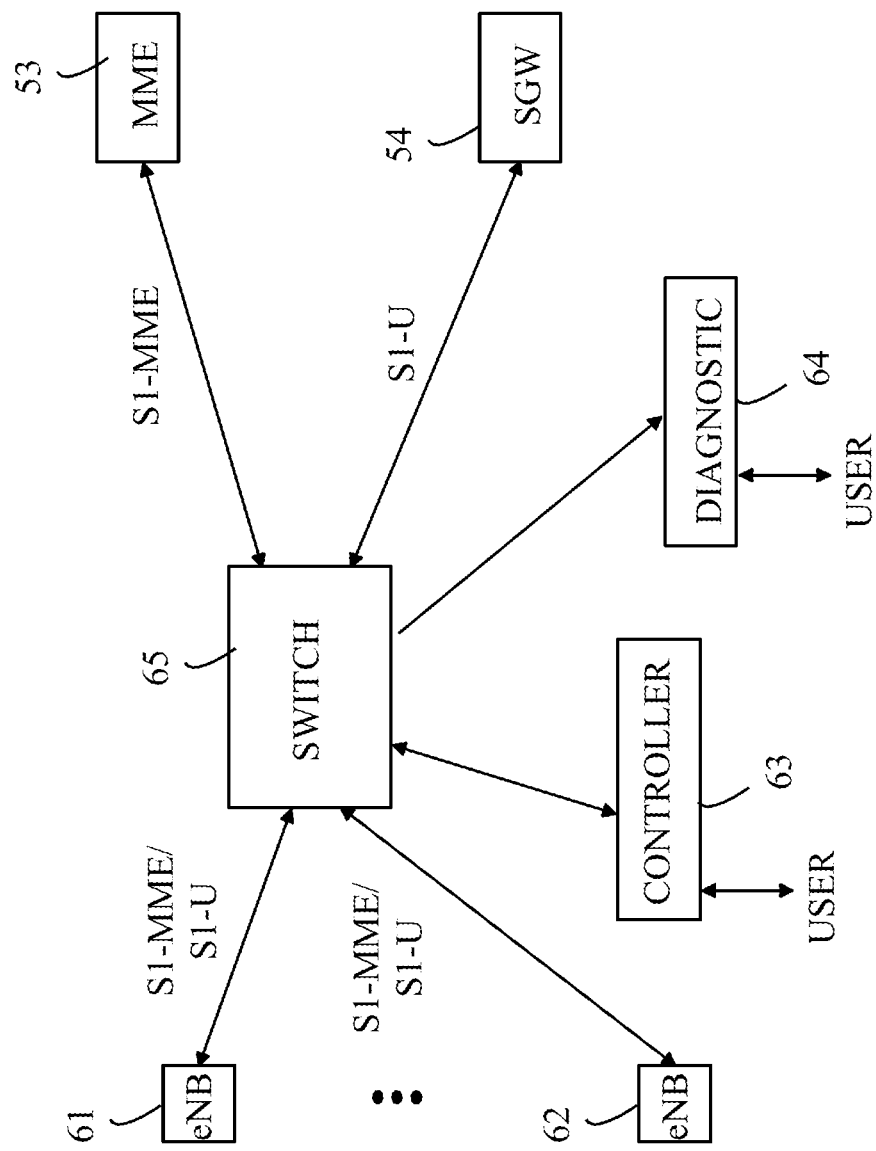
FIG. 2 illustrates the manner in which a monitoring system according to the present invention can be inserted into an existing cellular network.

The present invention is based on the observation that the cellular network from the eNBs to the external network can be monitored by selectively copying the transmissions to and from the various nodes to a troubleshooting tool. Referring now to FIG. 2, which illustrates the manner in which a monitoring system according to the present invention can be inserted into an existing cellular network. The monitoring system includes a software defined switch (SDS) 65, a controller 63, and a diagnostic tool 64. SDS 65 forwards traffic using transport layer attributes. SDS 65 receives traffic from the eNBs shown at 61 and 62 and routes that traffic to the MME 53 or the SGW 54 depending on the IP address of the destination in the packet. For example, messages using the S1-MME interface have a destination IP address equal to that of MME 53; while messages using the SGW 54 have a destination IP address corresponding to SGW 54. The traffic moving through SDS 65 is also copied to controller 63 which utilizes the content of the messages particularly those from the control plane in the S1-MME interface to discover the parameters of the cellular network including those that change over time. Controller 63 uses the decoded control plane traffic to build and maintain a mapping database that maps the IP addresses in the cellular system to cellular attributes of the nodes having those IP addresses. Using the mapping database, controller 63 can program SDS 65 to copy transport layer traffic related to specific cellular system attributes to diagnostic tool 64.

Consider the traffic from the eNBs to SGW 54. The user may wish to copy a particular subset of this traffic based on cellular parameters that are not part of the S1-U packets. However, the desired traffic can be separated based on the source IP address in the packets. In such cases, the cellular parameter of interest must be mapped to the desired source IP address using information discovered by monitoring messages on the S1-MME interface.

For example, the user may wish to collect all user plane traffic going on S1-U to and from a specific LTE cell. However, the LTE cell identity is not carried directly in the S1-U traffic packets. In general, SDS 65 operates using source and destination addresses. For example, SDS 65 typically operates on the source and destination IP addresses in the packets. Hence, to provide the desired data collection, the mapping between the LTE cell identity and eNB IP addresses must be known. Controller 63 includes a table that provides the correspondence between the IP addresses of the various eNBs and the eNB LTE cells hosted on that eNB (an eNB may host multiple LTE cells but this fact is not material to the procedures described in this invention). This mapping is created by examining the control messages to and from MME 53 and the eNBs. Given this mapping, controller 63 instructs SDS 65 to copy the S1-U messages to or from the IP address of the eNB hosting the LTE cell in question to diagnostic tool 64.

Figure 3:
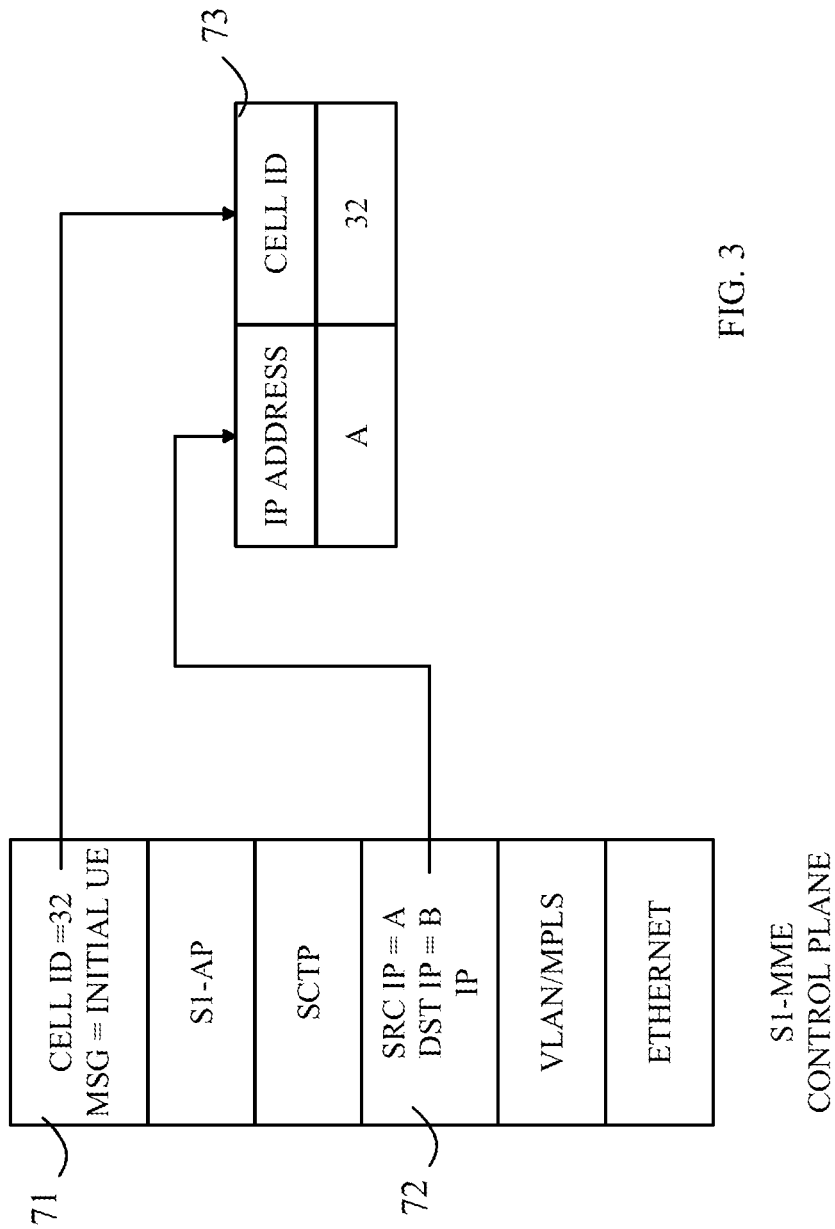
FIG. 3 illustrates a control message sent by an evolved Node B to a Mobility Management Entity when a new UE registers.

In one aspect of the invention, controller 63 determines the mapping between cell ID and IP addresses by monitoring the initialization messages in the control plane data between the eNBs and MME 53 sent by the eNBs when a new UE registers with an eNB. Refer now to FIG. 3, which illustrates a control message sent by an eNB to MME 53 when a new UE registers. The message includes an IP protocol type for SCTP of 132 which is used by SDS 65 to route the packets to controller 63. Controller 63 then examines the message type field 71 which has the cell ID and a message type "initial UE". The message also has the source IP address, in this case address A, of the eNB sending the message as well as the destination IP address, in this case B, of MME 53 to which it is directed. Controller 63 uses the cell ID shown in the message type field 71 and the source IP address shown in the IP field 72 to populate the corresponding entry in table 73.

In the above-described example, the cellular property of interest was mapped to a corresponding IP address, which was then used to select the packets of interest as those packets passed through SDS 65. However, SDSs that make packet forwarding decisions based on other fields in the packets are available. Some of these switches are proprietary; while others conform to a standard such as the OpenFlow standard. OpenFlow switches are manufactured by a number of vendors. For example, OpenFlow switches can be route based on the Ethernet MAC addresses, the VLAN/MPLS field or the SCTP field shown in FIG. 3.

For the purposes of the present discussion, an SDS is defined to be a switch that forwards incoming data packets on one of its ports to another of its ports based on forwarding rules that operate on one or more fields in the packets. The fields or attributes on which the SDS bases its forwarding decisions will be referred to as forwarding attributes in the following discussion. The forwarding rules can be downloaded to the SDS during the operation of the SDS without requiring interruption of other packet forwarding functions based on existing rules at the time of download and become active when downloaded. At least one of the rules allows an incoming packet to be forwarded to two ports, which provides the copying function discussed above.

In the above example, the cellular system that was being monitored was an LTE cellular system. However, there are a number of different cellular systems including GSM and UMTS that can be monitored using the present invention. In general, a first SDS is inserted into a first communication path in the network through which the packets of interest pass. Typically, this SDS is in the transport layer of the network. The diagnostic tool is attached to a port of the first SDS. The forwarding rules of the first SDS include rules that ensure that the packets that pass through the first SDS continue to be routed to the destination that those packets would have been routed to prior to the insertion of the first SDS into the first communication path. As noted in the above example, the first SDS can optionally interrupt a plurality of communication paths. The first SDS will be referred to as a packet copy SDS in the following discussion.

A second SDS, which may be the same as the first SDS or a different SDS, is inserted into a communication path through which control plane data that defines the correspondence between cellular attributes of interest in the cellular system and forwarding attributes on which the first SDS can be instructed to route. In the above example, the second SDS is the same SDS as the first SDS. The controller of the present invention is attached to a port of this switch and inserts commands into the switch to cause packets containing the correspondence between the forwarding attributes and the cellular attributes to be copied to the controller. The controller uses the data in these packets to maintain a correspondence table that provides the correspondence between the cellular attributes and the packet forwarding attributes. The second SDS will be referred to as a probe SDS.

The nature of the correspondence table will, in general, depend on the type of cellular system in which the present invention is inserted. However, the form of the table will be a series of records that include a cellular attribute of possible interest and the packet forwarding attributes that can be used to select that attribute. The manner in which the correspondence table is constructed for a number of different cellular systems and attributes will be discussed in more detail below.

When a user inputs a cellular attribute characterizing packets that are to be copied to the diagnostic tool of the controller, the controller looks up the packet forwarding attributes associated with that cellular attribute and downloads a forwarding rule to the packet copy SDS that causes the packet copy SDS to copy packets corresponding to the desired cellular attribute to the diagnostic tool.

Figure 4:
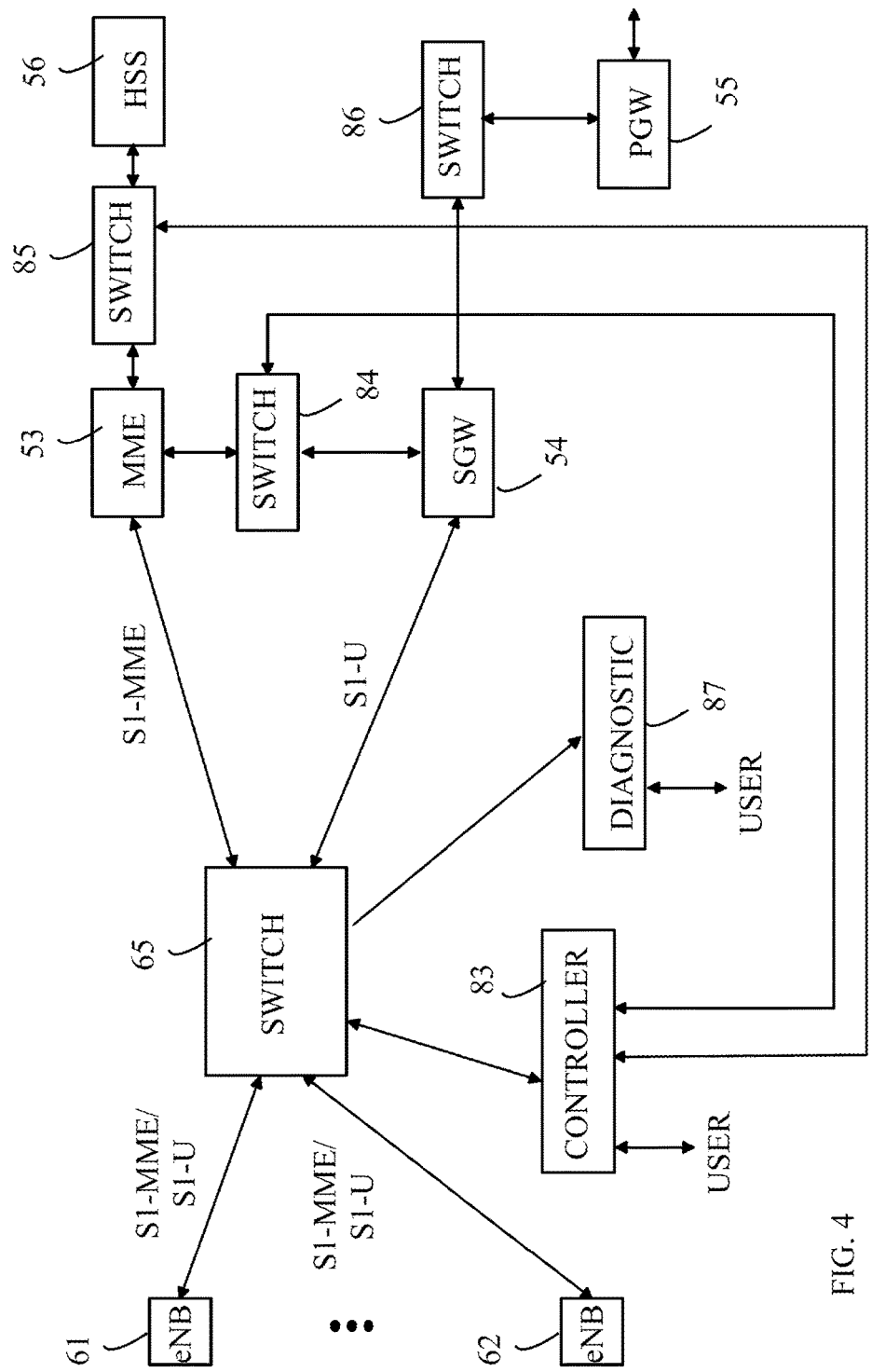
FIG. 4 illustrates the cellular system shown in FIG. 1 with multiple probe software defined switches and multiple packet copy software defined switches.

In the example shown in FIG. 2, the packet copy switch functions and the probe switch functions were included in a single SDS. However, as noted above, these functions can be implemented in separate SDSs. In addition, there may be multiple probe SDSs and/or packet copy switches introduced into the cellular network. Refer now to FIG. 4, which illustrates the cellular system shown in FIG. 1 with multiple probe software defined switches and multiple packet copy SDSs. In addition to the SDS 65 discussed above, the cellular system shown in FIG. 4 includes additional probe SDSs shown at 84 and 85, which are connected to controller 83. In addition the cellular system shown in FIG. 4 includes an additional packet copy SDS 86. To simplify the drawing, the connections between the ports of packet copy SDS 86 and controller 83 as well as diagnostic tool 87 have been omitted.

The interface between MME 53 and SGW 54 is known as the S11 interface and control plane signaling messages are exchanged between the MME and SGW in order to determine how packets from a mobile station are tunneled across the S1-U interface. In another aspect of this invention, the SDS 84 can be configured by controller 83 to collect control plane signaling (known as GTPv2-C) using a filter rule that selects packets with IP protocol UDP (value 17) and UDP source or destination port value 2123. Collected packets are sent to controller 83. Using the 'Create Session Request' control plane message as an example, the controller extracts the Access Point Name (APN) field and creates a mapping to the Serving Gateway IP address which is represented by the destination IP address of the control plane message. The controller 83 stores the mapping in its internal mapping database. The controller 83 may now, for example, use this mapping to allow a user to select traffic using an APN as a criterion and configuring SDS 65 to create a filter for packets matching the destination IP address associated with the APN. The matching packets are sent to diagnostic tool 87.

The interface between MME 53 and HSS6 is known as S6a and is primarily used to carry messaging indicating subscriber location, identity, authentication and service permissions. In another aspect of this invention SDS 85 can be configured by controller 83 to collect control plane signaling messages that match IP protocol type SCTP (value 132). Collected packets are sent to controller 83. Using the 'Update Location Request' message as an example, the controller extracts the 'Active APN' field which can contain an APN name and an IP address for the packet gateway node associated with the APN. The controller stores the mapping in its internal database. This mapping may then allow a user to select traffic using APN as a criterion and configuring SDS 65, for example, to create a filter for packets matching the IP address of the gateway node associated with the APN. The matching packets are sent to diagnostic tool 87.

As noted above, the controller discovers the correspondence between cellular attributes that may be of interest in monitoring or debugging a cellular system and a set of forwarding attributes that can be used to define switching rules in the SDSs within the internal network of the cellular system. The controller discovers the correspondence in question by monitoring control plane information within the cellular system. In general, the controller causes the probe SDS to copy all messages satisfying a particular forwarding attribute to the controller. The controller then examines each message or set of associated messages to determine if that message contains a cellular attribute of interest. If so, the controller unpacks the relevant information from the packet and uses that information to populate one or more entries in a table that stores the correspondence between the cellular attributes and the forwarding attributes that may be used to copy packets from another communication path in the cellular network. The controller can then use this correspondence to define forwarding attributes that are operative in the packet copy SDS to copy the desired packets as those packets pass through the packet copy SDS.

The cellular network can be viewed as consisting of a number of physical devices that communicate with one another over the communication links in the digital network. For communication purposes each device has one or more IP addresses associated with that device. The term 'IP address' refers to both IPv4 and IPv6 addresses unless otherwise stated. The device also has one or more cellular attributes associated with that device. A given attribute(s) may be associated with a particular one of a plurality of IP addresses for the device depending on the role being played by the physical device in the cellular system when that device sends or receives packets on the internal network. Hence, the database maintained by the controller of the present invention includes records that link a particular IP address associated with that device with one or more cellular attributes and also may specify the role in which this association applies.

The control plane database records can also include other attributes of the device that can be used to construct filters for selecting packets flowing through the copy SDS. These additional attributes may include the MAC address of the device.

To select control packets for examination, the controller programs the corresponding SDS to select packets based on some field that constitutes a switching attribute for that SDS. For the selection of control plane packets, the SCTP field of the packets is particularly useful as OpenFlow SDSs utilize this field as one of the fields on which switching decisions can be made. That is, packets having an IP protocol field equal to the SCTP value of 132 are copied to the controller port in the probe SDS. SCTP is used in telecom networks to carry different types of signaling (e.g. M3UA, NBAP, S1-AP) and so it is useful to be able to identify the different protocol types. SCTP is widely used and is not specific to any particular mobile technology. Hence, rules based on SCTP field values are useful in many different cellular systems.

Control plane messages that are sent and received during UE access procedures in a cell or the switching of the handling of that UE between cells when the UE moves are particularly useful in determining the correspondence between the cellular attributes assigned to that UE and the IP addresses of the cellular components that handle communications involving that UE. These messages can also have useful information about the cellular components in question, such as the correspondence between a cell ID and the IP address of that cell in the cellular system. Referring again to FIG. 3, the control messages in that example are messages sent when a UE accesses the cellular network using an eNB. The message provides the IP address and cell ID of the eNB, and hence, can be used to define that relationship for the controller. The return message from MME 53 can likewise be copied to controller 63 and will provide information about cellular attributes assigned to the UE in question such as attributes relating to the location of the UE within the cellular system and its temporary mobile subscriber identity (TMSI or GUTI) that is used to address the UE within the system to avoid revealing the true phone number of the UE.

A Location Area is a 3GPP concept used in GSM and UMTS to describe a group of cells in a common paging area. An MSC/VLR typically hosts a single LAI value, but could have more. A handset invokes the Location Update procedure on entering a cell associated with a different LAI which causes the network to assign a new LAI and TMSI to the handset. This procedure is part of the Mobility Management protocol and is common to both GSM and UMTS.

The LAI attribute has an internal structure consisting of three attributes: the mobile network code (MNC), a Mobile Country Code (MCC), and a local area code (LAC). The signaling messages of interest here would apply to GSM A-interface and Gs links and UMTS IuCS links. Note that we wish to discover the set of LAI(s) sent to the UE as these are the LAI(s) that can be associated with the transport layer attributes that can be used in packet forwarding rules. The UE may provide its previous LAI on entering the new LAI but the procedure here ignores this case and only considers the newly assigned LAI delivered to a handset in 'Update Accept' messages.

The correspondence between these location area attributes and IP addresses can be determined by copying control messages having an IP protocol type for SCTP of 132. The data stored by the controller consists of records of the form (IP Address, MCC, MNC, LAC, LAIRole). The LAIRole field is used to indicate if the IP Address is on the 'VLR Side' or the 'BSC/RNC Side'. First, select messages in which SCCP signaling contains BSSMAP (A-interface), BSSMAP+ (Gs) or RANAP (IuCS). If the message is of type Location Update Accept, extract the LAI, source IP and destination IP addresses. If the message is of type BSSAP+-LOCATION-UPDATE-ACCEPT, extract the LAI, source IP and destination IP addresses. If the IP address is the source IP address then the LAIRole is set to "VLR Side". A second record using the destination IP address is also created using the destination IP address and setting the LAIRole to 'BSC/RNC Side'.

A more complete listing of the various cellular attributes that can be discovered from the control plane messages is provided in Appendix A.

The controller of the present invention maintains a control plane database that allows various cellular attributes that are not explicitly present in transport layer packets to be translated to an entry that is present in the transport layer so that packets in the transport layer can be selectively filtered. The most common association is one of an IP address that corresponds to the cellular attribute in a given context. Given the IP address, the controller can program an SDS through which the transport layer packets pass to copy the packets to a diagnostic tool such as diagnostic tool 64 discussed with reference to FIG. 1 or to perform other functions on those packets. In some applications, it may be advantageous to refine such a filter such that actions are taken only on a sub-set of the packets having the IP address in question as a source or destination.

In one aspect of the invention, the controller also maintains a transport layer database for the switches in the transport layer that associate the IP addresses having packets passing through each switch port with a MAC address, the switch port, and whether the packet with that IP address is incoming or outgoing. The database also includes the VLAN tags and MPLS tags associated with the packets if any. This information allows the controller to refine or generalize a filter operating on that transport level switch to be more flexible in copying packets to the diagnostic tool or to perform other operations on the packets.

The transport layer database is populated by sampling data packets that pass through a switch or by programming the switch to capture packets that do not conform to an existing flow rule. Packets both entering and leaving the switch are analyzed. This procedure collects Ethernet frames containing IP packets with zero or more VLAN tags or zero or more MPLS labels. Other Ethernet frame types may be ignored. From the captured packet, the source IP address, source MAC address and VLAN or MPLS tags if present are extracted and a transport layer record using the physical switch port, indicating whether the packet is seen on the ingress or egress to the switch, is created. In addition, the destination IP address, destination MAC address and VLAN or MPLS tags if present are extracted and a transport layer record using the physical switch port, indicating whether the packet is seen on the ingress or egress to the switch is created.

While the above described embodiments utilize a diagnostic tool, embodiments in which the controller uses the transport layer database and control plane database to configure or reconfigure the network based on cellular network attributes can also be constructed. In general, the controller operates by first constructing the control plane and transport layer databases as discussed above. The controller accepts a request for configuration of the mobile network based on logical cellular network identities such as the cell ID. Using the control plane database and transport layer database, the controller translates the request into forwarding rules. The control plane database typically contains mappings from cellular attributes to IP addresses which can be used directly to create forwarding rules. The IP address can also be used as a search key to the transport layer database to allow the creation of filtering rules based on MAC addresses, VLAN or switch port numbers for example. The forwarding rules are then downloaded to the relevant SDSs to carry out the desired configuration of the cellular network. The actions that can be programmed at any SDS that conforms to the OpenFlow standard include, but are not limited to, 1. Drop a packet.
2. Forward to a physical switch port.
3. Forward to a load balancing group.
4. Change a VLAN tag.
5. Insert a VLAN tag.
6. Sample a packet. That is, select a sample of packets from a given rule.
7. Rewrite the source or destination MAC address.
8. Rewrite the source or destination IP address.
9. Apply traffic shaping to the packet.
10. Insert packet into an IP based tunnel such as VXLAN or GRE.

In general, an attribute used to make a forwarding decision in an SDS will be referred to as a forwarding attribute.

In the above-described embodiments, the SDS forwards packets based on an IP address in the packet. However, an SDS can also base forwarding decisions on other attributes such as an Ethernet MAC address or a VLAN tag. In one aspect of the invention, the controller creates a database that links one of these different forwarding attributes to the cellular attribute of interest.

This reconfiguration of the transport plane switches can be carried out without changing the operation of the control plane communications, and hence, can provide a means for reconfiguring the cellular system in response to problems encountered in normal operation.

The above described embodiments utilize SDSs that have been introduced into the cellular system to provide access to particular cellular communication paths. However, the cellular system often includes routing switches that can be replaced by an SDS. In addition, in configuring a new cellular system, the SDSs can be introduced as part of the cellular design.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A system comprising:
a cellular network having a control plane and transport plane and a plurality of internal nodes, said control plane being characterized by a plurality of control plane packets transmitted between pairs of said internal nodes and said transport plane being characterized by a plurality of user data packets transmitted between pairs of said internal nodes, each internal node being characterized by one or more cellular attributes and one or more forwarding attributes, said cellular attributes being different from said forwarding attributes, each cellular attribute being communicated in a packet in said control plane between a pair of said internal nodes that was communicated in said control plane, said packet describing a network element or an attribute associated with a user identity or a user location, each forwarding attribute being selected from the group consisting of MAC addresses, IP addresses, VLAN tags and MPLS tags;
a transport plane SDS inserted in said transport plane, said transport plane SDS forwarding user data packets between ones of said plurality of internal nodes of said cellular network, said transport plane SDS forwarding both control plane packets to nodes servicing said control plane packets and user data packets to nodes that package user data for transport to a network that is external to said cellular network, said forwarding being determined by forwarding attributes in said user data packets; and
a controller comprising a control plane database having a plurality of entries, each entry storing a correspondence between one of said forwarding attributes for one of said internal nodes and one of said cellular attributes for said one of said internal nodes, said controller being configured to receive user input specifying a forwarding change in said transport plane SDS in terms of one of said cellular attributes that is not contained in said user data packets transmitted in said transport plane, said controller using said control plane database to determine a forwarding attribute corresponding to said one of said cellular attributes and downloading a forwarding rule to said transport plane SDS that causes said transport plane SDS to execute said forwarding change for packets having a particular cellular attribute, wherein said controller constructs said entries from control plane packets forwarded by said transport plane SDS.

2. The system of claim 1 wherein said forwarding attribute comprises an IP address.

3. The system of claim 1 further comprising:
a control plane SDS inserted in said control plane and controlled by said controller, said control plane SDS forwarding packets in said control plane between nodes of said cellular network, said controller copying control plane packets that are forwarded by said control plane SDS and generating one of said entries in said control plane database from said copied control plane packets.

4. The system of claim 3, wherein one of said copied control plane packets comprised information specifying a cellular attribute for one of said plurality of internal nodes and an IP address for that one of said plurality of internal nodes.

5. The system of claim 3 wherein one of said copied control plane packets is specified by a forwarding rule based on an SCTP field value in said one of said copied control plane packets.

6. The system of claim 3 wherein one of said copied control plane packets is a packet sent as part of a procedure in which a UE in a cell of said cellular network registers with said cellular network.

7. The system of claim 3 wherein said control plane SDS and said transport plane SDS are implemented in a single SDS.

8. The system of claim 7 wherein said transport plane database also relates said IP addresses to Ethernet MAC addresses, VLAN, and MPLS tags in said packets passing through said transport plane SDS.

9. The system of claim 7 wherein said cellular network is an LTE cellular network characterized by a plurality of eNBs, an MME, an HSS, and an SGW, and wherein said single SDS receives packets from said eNBs, MME, HSS or SGW and forwards said received packets to either said eNBs, MME, HSS or said SGW depending on said received packets.

10. The system of claim 7 wherein said cellular network is a GSM cellular network characterized by a plurality of BTSs, a BSC, an MSC, an SGSN and an HLR, wherein said single SDS receives packets from said BTSs, BSC, MSC, SGSN or HLR and forwards said packets to either said BTSs, BSC, MSC, SGSN or HLR depending said packets.

11. The system of claim 7 wherein said cellular network is a UMTS cellular network characterized by a plurality of NodeBs, an RNC, an MSC, an SGSN and an HLR, wherein said single SDS receives packets from said NodeBs, RNC, MSC, SGSN and HLR and forwards said packets to either said NodeBs, RNC, MSC, SGSN and HLR depending on the format of said packets.

12. The system of claim 1 wherein said controller further generates a transport plane database relating IP addresses in packets passing through said transport plane SDS to ports of said transport plane SDS through which said packets pass and whether said packets were inbound to or outbound from said transport plane SDS.

13. A method for monitoring a cellular network having a control plane and transport plane and a plurality of internal nodes, said control plane being characterized by a plurality of control plane packets transmitted between pairs of said internal nodes and said transport plane being characterized by a plurality of user data packets transmitted between pairs of said internal nodes, each internal node being characterized by one or more cellular attributes and one or more forwarding attributes, said cellular attributes being different from said forwarding attributes, each cellular attribute being communicated in a packet in said control plane between a pair of said internal nodes that was communicated in said control plane, said packet describing a network element or an attribute associated with a user identity or a user location, each forwarding attribute being selected from the group consisting of MAC addresses, IP addresses, VLAN tags and MPLS tags, said cellular network comprising a transport plane SDS inserted in said transport plane, said transport plane SDS being controlled by a controller and forwarding user data packets between ones of said plurality of internal nodes of said cellular network, said forwarding being determined by forwarding attributes in said user data packets, said method comprising:

maintaining a control plane database that stores a correspondence between said forwarding attributes and said cellular attributes for a plurality of said internal nodes, wherein said cellular attributes are not contained in said user data packets transmitted in said transport plane; and receiving user input specifying a forwarding change in said transport plane SDS in terms of one of said cellular attributes that is not contained in said user data packets, said controller using said control plane database to determine a forwarding attribute corresponding to said one of said cellular attributes and downloading a forwarding rule to said transport plane SDS that causes said transport plane SDS to execute said forwarding change.

14. The method of claim 13 wherein said cellular network comprises a control plane SDS inserted in said control plane and controlled by said controller, said control plane SDS forwarding packets in said control plane between nodes of said cellular network, said method further comprising causing said controller to copy control plane packets that are forwarded by said control plane SDS and generate said control plane database from said copied control plane packets.

15. The method of claim 14 wherein one of said copied control plane packets is a packet sent as part of a procedure in which a UE in a cell of said cellular network registers with said cellular network.

* * * * *